US012804418B2

(12) United States Patent
Chi

(10) Patent No.: US 12,804,418 B2
(45) Date of Patent: Nov. 17, 2026

(54) BEAM CONFIGURATION METHOD, BEAM DETERMINATION METHOD, BASE STATION, SIGNAL RELAY DEVICE, AND STORAGE MEDIUM

(71) Applicant: Beijing Xiaomi Mobile Software Co., Ltd., Beijing (CN)

(72) Inventor: Liangang Chi, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 291 days.

(21) Appl. No.: 18/690,035

(22) PCT Filed: Sep. 24, 2021

(86) PCT No.: PCT/CN2021/120420
§ 371 (c)(1),
(2) Date: Mar. 7, 2024

(87) PCT Pub. No.: WO2023/044787
PCT Pub. Date: Mar. 30, 2023

(65) Prior Publication Data
US 2024/0430698 A1 Dec. 26, 2024

(51) Int. Cl.
*H04W 16/28* (2009.01)
*H04L 5/00* (2006.01)

(52) U.S. Cl.
CPC ........... *H04W 16/28* (2013.01); *H04L 5/0094* (2013.01)

(58) Field of Classification Search
CPC ................ H04W 16/28; H04W 84/047; H04B 7/04013; H04B 7/06952; H04B 7/0628;
(Continued)

(56) References Cited

U.S. PATENT DOCUMENTS 11,050,543 B1 6/2021 Anantharaman et al.
2014/0029508 A1* 1/2014 Kim ...................... H04B 7/155
370/315
(Continued)

FOREIGN PATENT DOCUMENTS

CN 109891773 A 6/2019
CN 113115445 A 7/2021
(Continued)

OTHER PUBLICATIONS

Extended European Search Report Issued in Application No. 21957913.3 dated Jun. 6, 2025, 14 pages.
(Continued)

*Primary Examiner* — Jean A Gelin
(74) *Attorney, Agent, or Firm* — Finnegan, Henderson, Farabow, Garrett & Dunner, L.L.P.

(57) ABSTRACT

A beam configuration method is performed by a base station, wherein a signal is transmitted between the base station and a terminal at least by a signal relay device. The method includes: receiving capability information transmitted by the signal relay device; determining, based on the capability information, identifiers of reference signals supported on a link on which the signal relay device communicates with the terminal, and information for beams corresponding to the identifiers of the reference signals; and selecting, based on the identifiers of the reference signals and the information for the beams, target reference signal identifiers from the identifiers of the reference signals, and configuring the target reference signal identifiers to the signal relay device for communication of the signal relay device on the link by beams corresponding to the target reference signal identifiers.

17 Claims, 6 Drawing Sheets

(58) Field of Classification Search

CPC ... H04B 7/088; H04B 7/15528; H04L 5/0023; H04L 5/0091; H04L 5/0094; H04L 5/0048

USPC .......................................................... 370/329

See application file for complete search history.

(56) References Cited

U.S. PATENT DOCUMENTS

| | | | | |
|---|---|---|---|---|
| 2015/0236777 | A1* | 8/2015 | Akhtar | H04B 7/15528 455/450 |
| 2016/0044613 | A1* | 2/2016 | Cai | H04W 88/04 370/315 |
| 2018/0083680 | A1 | 3/2018 | Guo et al. | |
| 2018/0131434 | A1 | 5/2018 | Islam et al. | |
| 2018/0323856 | A1 | 11/2018 | Xiong et al. | |
| 2019/0159149 | A1* | 5/2019 | Ryu | H04W 56/0045 |
| 2019/0306909 | A1 | 10/2019 | Zhou et al. | |
| 2020/0028547 | A1* | 1/2020 | Gao | H04B 7/0408 |
| 2020/0052775 | A1 | 2/2020 | Nam et al. | |
| 2020/0280365 | A1* | 9/2020 | Abedini | H04B 17/318 |
| 2020/0359435 | A1* | 11/2020 | Raghavan | H04B 17/336 |
| 2020/0374717 | A1 | 11/2020 | He et al. | |
| 2021/0126694 | A1* | 4/2021 | Abedini | H04B 7/0408 |
| 2021/0135734 | A1 | 5/2021 | Abedini et al. | |
| 2021/0235501 | A1 | 7/2021 | Ashwin et al. | |
| 2022/0053433 | A1* | 2/2022 | Abedini | H04B 7/06952 |
| 2022/0069868 | A1* | 3/2022 | Abedini | H04B 7/043 |
| 2024/0243803 | A1* | 7/2024 | Echigo | H04B 7/1555 |
| 2024/0284195 | A1* | 8/2024 | Zhang | H04W 84/047 |

FOREIGN PATENT DOCUMENTS

| | | | | | |
|---|---|---|---|---|---|
| CN | 113242571 | A | | 8/2021 | |
| CN | 114303324 | A | * | 4/2022 | H04W 72/23 |
| CN | 114375605 | A | * | 4/2022 | H04W 72/23 |
| CN | 115913484 | B | * | 11/2024 | H04L 5/00 |

OTHER PUBLICATIONS

ISA State Intellectual Property Office of the People's Republic of China, Written Opinion of the International Searching Authority Issued in Application No. PCT/CN2021/120420, Mar. 28, 2022, WIPO, 7 pages.

Partial Supplementary European Search Report Issued in Application No. 21957913.3 dated Jun. 6, 2025, 14 pages.

ISA State Intellectual Property Office of the People's Republic of China, International Search Report Issued in Application No. PCT/CN2021/120420, Mar. 28, 2022, WIPO, 4 pages.

National Instruments, "Views on Beam Recovery Mechanism" 3GPP TSG RAN WG1 Meeting 90bis R1-1718457, Prague, Czech Republic, Oct. 9-13, 2017, 3 pages.

Examination report for India Application No. 202417030021 dated May 4, 2026, 10 pages.

State Intellectual Property Office of the People's Republic of China, Office Action and Search Report Issued in Application No. 2021800965008, Jul. 10, 2026, 34 pages.

Nokia, Nokia Shanghai Bel, "Discussion on sidelink assisted mobility using UE-to-Nwk Relay", R2-2108467, 3GPP TSG-RAN WG2 Meeting #115 Electronic Elbonia, Aug. 16-27, 2021, 4 pages.

* cited by examiner

BEAM CONFIGURATION METHOD, BEAM DETERMINATION METHOD, BASE STATION, SIGNAL RELAY DEVICE, AND STORAGE MEDIUM

CROSS REFERENCE TO RELATED APPLICATIONS

This application is a National Phase of International Application No. PCT/CN2021/120420, filed on Sep. 24, 2021, the entire content of which is incorporated herein by reference in its entirety.

TECHNICAL FIELD

The present disclosure relates to the field of communication technologies, and in particular to a beam configuration method, a beam determination method, a base station, a signal relay device, and a storage medium.

BACKGROUND

Relaying is a simple and low-cost mean of improving network coverage, and a relay device is deployed in large numbers in 2nd generation (2G), 3rd generation (3G), and 4th generation (4G) communication systems to provide supplemental coverage.

SUMMARY

According to a first aspect of embodiments of the present disclosure, there is provided a beam configuration method, performed by a base station, where a signal is transmitted between the base station and a terminal at least by a signal relay device, and the method includes: receiving capability information transmitted by the signal relay device: determining, based on the capability information, identifiers of reference signals supported on a link on which the signal relay device communicates with the terminal, and information for beams corresponding to the identifiers of the reference signals: and selecting, based on the identifiers of the reference signals and the information for the beams, target reference signal identifiers from the identifiers of the reference signals, and configuring the target reference signal identifiers to the signal relay device for communication of the signal relay device on the link by beams corresponding to the target reference signal identifiers.

According to a second aspect of embodiments of the present disclosure, there is provided a beam determination method, performed by a signal relay device, where a signal is transmitted between a base station and a terminal at least by the signal relay device, and the method includes: transmitting capacity information to the base station, where the capacity information is configured to indicate identifiers of reference signals supported on a link on which the signal relay device communicates with the terminal, and information for beams corresponding to the identifiers of the reference signals: receiving target reference signal identifiers selected, by the base station based on the identifiers of the reference signals and the information for the beams, from the identifiers of the reference signals: and performing, by beams corresponding to the target reference signal identifiers, communication on the link.

According to a third aspect of embodiments of the present disclosure, there is provided a beam configuration device, applied to a base station, where a signal is transmitted between the base station and a terminal at least by a signal relay device, and the device includes one or more processors configured to perform operations including: receiving capability information transmitted by the signal relay device: determining, based on the capability information, identifiers of reference signals supported on a link on which the signal relay device communicates with the terminal, and information for beams corresponding to the identifiers of the reference signals: and selecting, based on the identifiers of the reference signals and the information for the beams, target reference signal identifiers from the identifiers of the reference signals, and configuring the target reference signal identifiers to the signal relay device for communication of the signal relay device on the link by beams corresponding to the target reference signal identifiers.

According to a fourth aspect of embodiments of the present disclosure, there is provided a beam determination device, applied to a signal relay device, where a signal is transmitted between a base station and a terminal at least by the signal relay device, and the device includes one or more processors configured to perform operations including: transmitting capacity information to the base station, where the capacity information is configured to indicate identifiers of reference signals supported on a link on which the signal relay device communicates with the terminal, and information for beams corresponding to the identifiers of the reference signals: receiving target reference signal identifiers selected, by the base station based on the identifiers of the reference signals and the information for the beams, from the identifiers of the reference signals: and performing, by beams corresponding to the target reference signal identifiers, communication on the link.

According to a fifth aspect of an embodiment of the present disclosure, there is provided a base station including: a processor: a memory storing computer programs: where the computer programs, when executed by the processor, cause the processor to perform the beam configuration method.

According to a sixth aspect of embodiments of the present disclosure, there is provided a signal relay device including: a processor: and a memory storing computer programs: where the computer programs, when executed by the processor, cause to the processor to perform the beam determination method.

BRIEF DESCRIPTION OF THE DRAWINGS

In order to more clearly describe the technical solutions in the embodiments of the present disclosure, the drawings required for descriptions of the embodiments of the present disclosure will be briefly introduced below. Apparently, the drawings described hereunder are only some embodiments of the present disclosure. Those skilled in the art may obtain other drawings based on these drawings without making creative work.

DETAILED DESCRIPTION OF THE EMBODIMENTS

Figure 1:
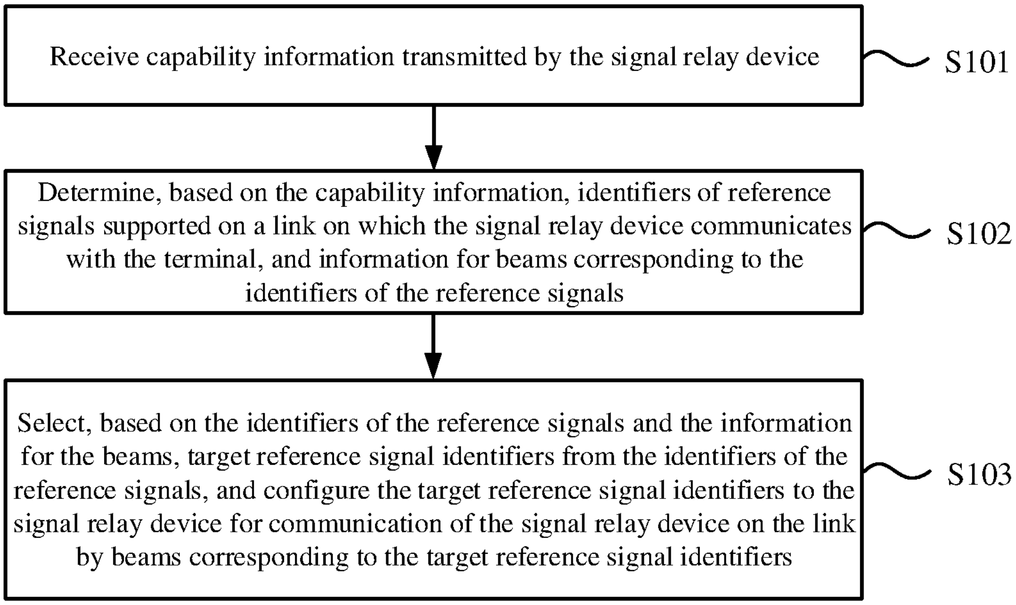
FIG. 1 is a schematic flowchart illustrating a beam configuration method according to an embodiment of the present disclosure.

The technical solutions of the embodiments of the present disclosure will be fully and clearly described below in combination with the drawings in the embodiments of the present disclosure. Apparently, the embodiments described herein are only some embodiments of the present disclosure rather than all embodiments of the present disclosure. Other embodiments obtained by persons of ordinary skill in the art based on these embodiments of the present disclosure without making inventive work shall all fall within the scope of protection of the present disclosure The terms used in the present disclosure are for the purpose of describing particular examples only, and are not intended to limit the present disclosure. Terms determined by “a”, “the” and “the” in their singular forms in the present disclosure and the appended claims are also intended to include plurality, unless clearly indicated otherwise in the context. It should also be understood that the term “and/or” as used herein refers to and includes any and all possible combinations of one or more of the associated listed items.

It is to be understood that, although the terms “first,” “second,” “third,” and the like may be used in the present disclosure to describe various information, such information should not be limited to these terms. These terms are only used to distinguish one category of information from another. For example, without departing from the scope of the present disclosure, first information may be referred as second information: and similarly, the second information may also be referred as the first information. Depending on the context, the term “if” as used herein may be interpreted as “when” or “upon” or “in response to determining”.

For the purposes of brevity and ease of understanding, the terms “greater than” or “less than”, “higher than” or “lower than” are used herein to characterize size relationships. However, for those skilled in the art, it will be understood that the term “greater than” also covers the meaning of “greater than or equal to”, and the term “less than” also covers the meaning of “less than or equal to”: the term “higher than” covers the meaning of “higher than or equal to”, and the term “lower than” covers the meaning of “lower than or equal to”.

Relaying is also expected to be deployed in a 5th generation (5G) communication system, but there are some differences between communication methods in the 5G communication system and those in the 2G, 3G, and 4G communication systems. For example, communication in the 5G communication system is performed by beam scanning, and current configurations for relaying are based on the considerations of the 2G, 3G, and 4G communication systems, and there is no beam scanning configuration of relaying or related functional equipment. The current configuration for relaying is based on the 2G, 3G, and 4G communication systems, and there is no reasonable configuration for relaying or related functional device in terms of beam.

In view of this, embodiments of the present disclosure provide a beam configuration method, a beam determination method, a beam configuration device, a beam determination device, a terminal, a base station, a signal relay device, and a computer-readable storage medium to solve technical problems in the related art.

FIG. 1 is a schematic flowchart illustrating a beam configuration method according to an embodiment of the present disclosure. The beam configuration method shown in this embodiment may be performed by a base station. The base station may communicate with a terminal. The terminal includes, but is not limited to, a communication device such as a cell phone, a tablet computer, a wearable device, a sensor, an IoT device, and the like. The base station includes, but is not limited to, a base station in a communication system such as a 4th generation (4G) base station, a 5th generation (5G) base station, a 6th generation (6G) base station, and the like.

In an embodiment, the base station and the terminal may communicate with each other at least by the signal relay device. The signal relay device can transmit a signal (e.g., referred to as a downlink signal) transmitted by the base station to the terminal, and can also transmit a signal (e.g., referred to as an uplink signal) transmitted by the terminal to the base station.

In an embodiment, the signal relay device includes at least one of: a smart repeater, or a reconfigurable intelligent surface (RIS).

Conventional radio frequency (RF) relay can only perform receiving, RF converting, and amplifying and forwarding a RF signal, and cannot reflect a beam signal or perform operations such as beam fouling, which imposes limitations on the performance of the communication system.

The RIS is different from traditional RF relay. in the embodiments of the present disclosure, the RIS can be deployed on any one of surfaces of various types of objects in the wireless transmission environment to receive and reflect beams, which is expected to break through the uncontrollability of the conventional wireless channel, build an intelligent and programmable wireless environment, and introduce a new paradigm of future wireless communication. On the one hand, the RIS can actively enrich the channel scattering conditions and enhance the multiplexing gain of the wireless communication system. On the other hand, the RIS can realize the signal propagation direction regulation and isophase superposition in three-dimensional space, increase the received signal strength, and improve the transmission performance between communication devices. Therefore, the RIS has great potential to be used for coverage enhancement and capacity boosting of future wireless networks to eliminate localized coverage voids.

The intelligent repeater is also different from the conventional RF relay in that the intelligent relay can not only realize the functions that are already available in the conventional relays, such as receiving, RF converting, and amplifying and retransmitting RF signals, but also receiving beams, transmitting beams, and performing operations such as beam fouling.

As shown in FIG. 1, the beam configuration method may include the following steps S101 and S103.

At step S101, capability information transmitted by the signal relay device is received.

At step S102, identifiers of reference signals supported on a link on which the signal relay device communicates with the terminal, and information for beams corresponding to the identifiers of the reference signals are determined based on the capability information.

At step S103, based on the identifiers of the reference signals and the information for the beams, target reference signal identifiers are selected from the identifiers of the reference signals, and the target reference signal identifiers are configured to the signal relay device for communication of the signal relay device on the link by beams corresponding to the target reference signal identifiers.

According to the embodiments of the present disclosure, the base station may configure a suitable beam for the signal relay device based on the capability information of the signal relay device for communication on the link from the signal relay device to the terminal. It is avoided that the signal relay device uses too many beams and causes waste of resources, or uses too few beams and causes deterioration of communication quality.

In an embodiment, the base station may communicate with the terminal via the signal relay device. In this case, there are two links from the base station to the terminal, the one link is from the base station to the signal relay device, and the other link is from the signal relay device to the terminal. The embodiments of the present disclosure primarily describe communication on the link from the signal relay device to the terminal. In addition, it is to be noted that the base station, when communicating with the terminal via the signal relay device, may also communicate directly with the terminal at the same time, and the present disclosure does not limit the manner of communication between the base station and the terminal.

In an embodiment, the capabilities of different signal relay devices may be different. For example, the identifiers of the reference signals supported on a link on which the signal relay device communicates with the terminal, and the information of the beams corresponding to the identifiers of the reference signals may be different. The identifiers of the reference signals include at least one of: a synchronization signal block (SSB) index, or a channel state information-reference signal (CSI-RS) port number.

For example, some signal relay devices support the identifiers of the reference signals with the SSB indexes 1 to 64, and some signal relay devices support the identifiers of the reference signals with the CSI-RS ports 1 to 32.

Moreover, since there is a correspondence between an identifier of a reference signal and a beam, information of supported beams will be different depending on identifiers of supported reference signals. The information of the beam includes at least one of: a beam angle range, or a beam frequency. The following is mainly exemplary for the beam angle range.

For example, there are signal relay devices that support a beam angle range of 0° to 180°, and there are signal relay devices that support a beam angle range of 0° to 270°. An endpoint and a direction corresponding to 0° of the beam angle range may be configured by the base station. For example, the endpoint may be a location of the signal relay device, and the direction corresponding to 0° may be a direction in which the signal relay device is pointing towards the base station.

The signal relay device can report the capability information to the base station, such that the base station can determine identifiers of reference signals supported on a link on which the signal relay device communicates with the terminal, and information for beams corresponding to the identifiers of the reference signals. For example, it is determined that the signal relay device supports CSI-RS ports 1 to 32, each of which corresponds to a beam with an angle range of 5°, e.g., CSI-RS port 1 corresponds to a beam with an angle range of 0° to 5°, CSI-RS port 2 corresponds to a beam with an angle range of 5° to 10°, and so on, and an angle range of a beam corresponding to CSI-RS port 32 is 155° to 160°.

Further, the base station may select, according to the need, beams corresponding to target reference signal identifiers from the beams corresponding to the identities of the reference signals supported by the signal relay device, and indicate the beams corresponding to the target reference signal identifiers to the signal relay device. For example. if the base station determines that, according to the need, it is only necessary for the signal relay device to use the beam for communication in the beam angle range of 40° to 80°, the base station can determine that CSI-RS ports 9 to 16 are the target reference signal identifiers, and the CSI-RS ports 9 to 16 are configured to the signal relay device. Subsequent the signal relay device may perform communication on the link from the signal relay device to the terminal via the beams corresponding to one or more of the CSI-RS ports 9 to 16.

According to the embodiments of the present disclosure, the base station may configure a suitable beam for the signal relay device based on the capability information of the signal relay device for communication on the link from the signal relay device to the terminal. It is avoided that the signal relay device uses too many beams and causes waste of resources, or uses too few beams and causes deterioration of communication quality.

Figure 2:
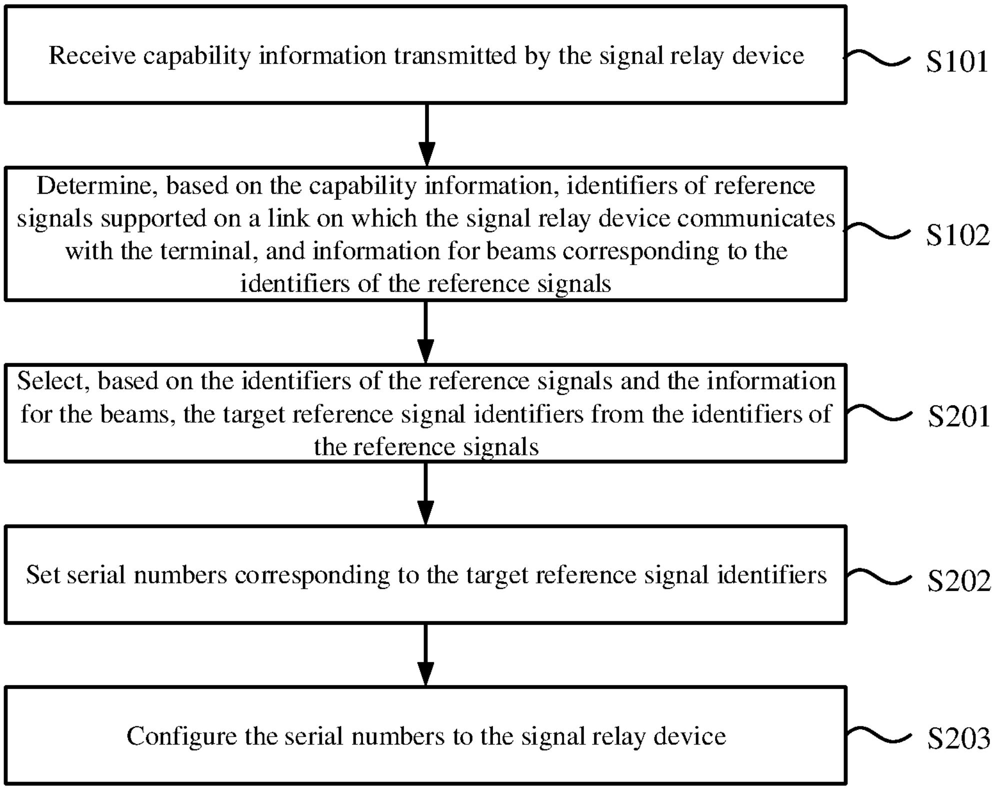
FIG. 2 is a schematic flowchart illustrating a beam configuration method according to another embodiment of the present disclosure.

FIG. 2 is a schematic flowchart illustrating a beam configuration method according to another embodiment of the present disclosure. As shown in FIG. 2, selecting, based on the identifiers of the reference signals and the information for the beams, the target reference signal identifiers from the identifiers of the reference signals, and configuring the target reference signal identifiers to the signal relay device for communication of the signal relay device on the link by the beams corresponding to the target reference signal identifiers include the following steps S201 to S203.

At step S201, based on the identifiers of the reference signals and the information for the beams, the target reference signal identifiers are selected from the identifiers of the reference signals.

At step S202, serial numbers corresponding to the target reference signal identifiers are set.

At step S203, the serial numbers are configured to the signal relay device.

In an embodiment, the base station may select, according to the need, the beams corresponding to the target reference signal identifiers from the beams corresponding to the identities of the reference signals supported by the signal relay device, and indicate the beams corresponding to the target reference signal identifiers to the signal relay device.

For example, the signal relay device supports CSI-RS ports 1 to 32, and each CSI-RS port corresponds to a beam angle range of 5°, such as CSI-RS port 1 corresponds to a beam with an angle range of 0° to 5°, CSI-RS port 2 corresponds to a beam with an angle range of 5° to 10°, and so on, and an angle range of a beam corresponding CSI-RS port 32 is from 155° to 160°.

If the base station determines that, according to the need, it is only necessary for the signal relay device to use the beam for communication in the beam angle range of 40° to 80°, the base station can determine that CSI-RS ports 9 to 16 are the target reference signal identifiers.

After the target reference signal identifiers are determined, since a number of the target reference signal identifiers is, in general, less than a number of the identifiers of the reference signals, e.g., in this embodiment, the number of the target reference signal identifiers is eight, and the number of the identifiers of the reference signals is thirty-two, serial numbers corresponding to the target reference signal identifiers can be set, i.e., the target reference signal identifiers can be renumbered.

For example, the target reference signal identifiers are CSI-RS ports 9 to 16 of the thirty-two CSI-RS ports. If the CSI-RS ports 9 to 16 are indicated by the original serial numbers (i.e., 9 to 16) of the CSI-RS ports 9 to 16, thirty-two indication results would be required, with occupying at least 5 bits, but in reality, the number of the target reference signal identifiers is only eight. In the embodiment of the present disclosure, the CSI-RS ports (i.e., the target reference signal identifiers) can be renumbered, so that the CSI-RS ports 9 to 16 correspond to the serial numbers from 1 to 8. For example, serial number 1 (corresponding to bit 000) corresponds to the CSI-RS port 9, serial number 2 (corresponding to bit 001) corresponds to the CSI-RS port 10, and so on, and serial number 8 (corresponding to bit 111) corresponds to the CSI-RS port 16, thereby only 3 bits are required to realize indication of eight identifiers, and the communication resources are saved.

Figure 3:
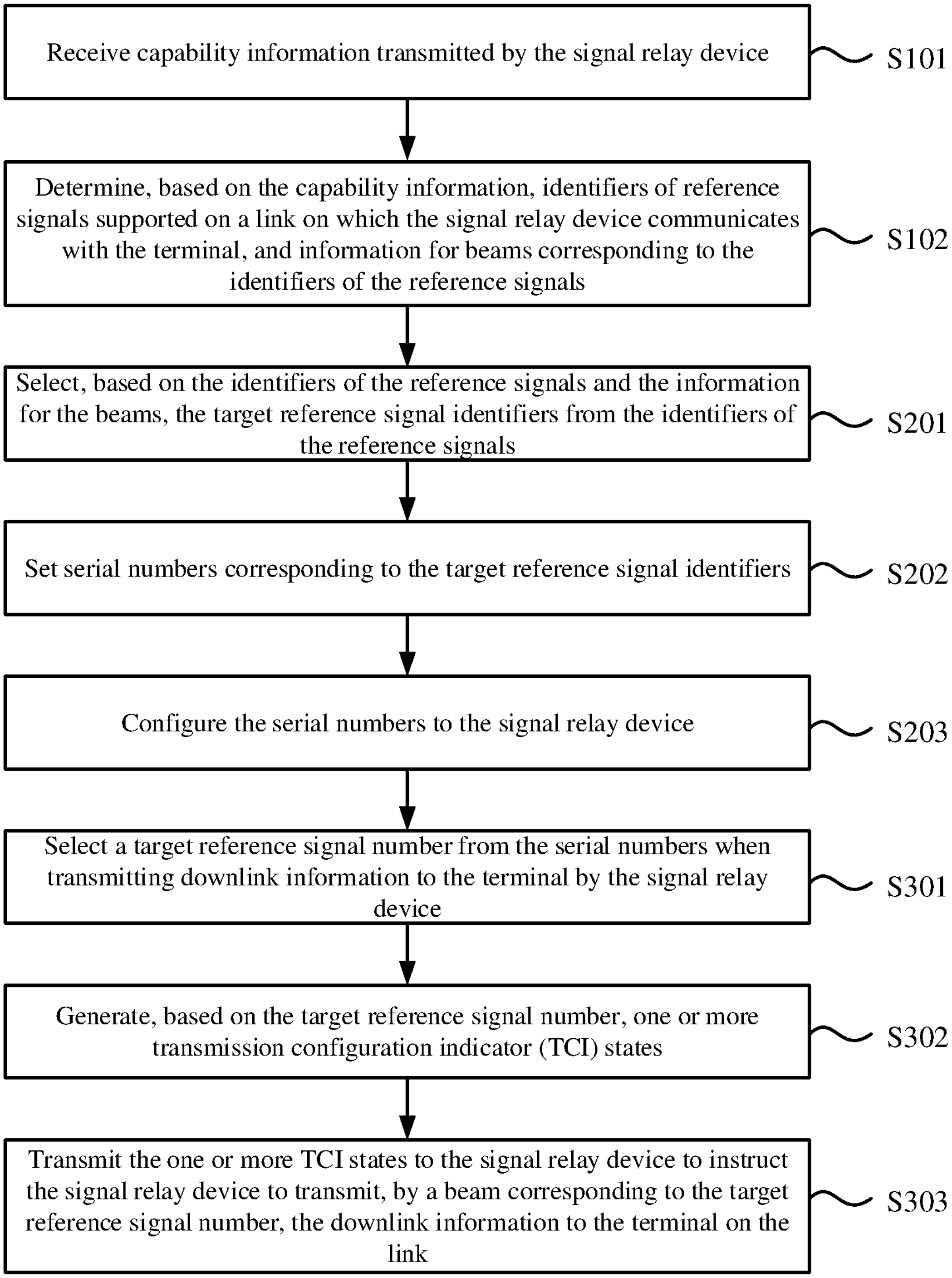
FIG. 3 is a schematic flowchart illustrating a beam configuration method according to yet another embodiment of the present disclosure.

FIG. 3 is a schematic flowchart illustrating a beam configuration method according to yet another embodiment of the present disclosure. As shown in FIG. 3, the method further includes the following steps S301 to S303.

At step S301, a target reference signal number is selected from the serial numbers corresponding to the target reference signal identifiers when downlink information is transmitted to the terminal by the signal relay device.

At step S302, one or more transmission configuration indicator (TCI) states are generated based on the target reference signal number.

At step S303, the one or more TCI states are transmitted to the signal relay device to instruct the signal relay device to transmit, by a beam corresponding to the target reference signal number, the downlink information to the terminal on the link.

In an embodiment, the base station, after setting the serial numbers corresponding to the target reference signal identifiers and configuring the serial numbers to the signal relay device, may further select a target reference signal number selected from the serial numbers configured to the signal relay device as needed.

Since the positions of the base station and the signal relay device are generally relatively fixed (of course, they can also be set to be mobile as needed), and the position of the terminal is generally changing, when each time the base station transmits the downlink information to the terminal via the signal relay device, the terminal may be positioned all differently. The terminal may report its own position to the base station or report the reference signal identifier corresponding to the proposed beam, so that the base station may determine, based on the position of the terminal, which angle of the beam used by the signal relay device is more appropriate for transmitting the downlink information to the terminal, or the base station may determine, based on the reference signal identifier corresponding to the proposed beam reported by the terminal, which angle of the beam used by the signal relay device is more appropriate for transmitting the downlink information to the terminal. Of course, in addition to determining the target reference signal number based on the position of the terminal, the base station may also determine the target reference signal number by taking other factors into account, for example, the target reference signal number corresponding to the beam may be determined based on the downlink information.

For example, if the base station determines that the signal relay device needs to transmit the downlink information to the terminal by using the beam corresponding to the target reference signal number, the target reference signal number may be indicated by transmitting a TCI state to the signal relay device, i.e., the target reference signal number may be indicated by the TCI state. For example, the signal relay device may determine that a serial number corresponding to an identifier of a quasi co-location (QCL) reference signal indicated by the TCI state in the serial numbers is the target reference signal number, i.e., the beam corresponding to the target reference signal number determined by the signal relay device is the same as the beam of the QCL reference signal, thereby the signal relay device may transmit the downlink information to the terminal by the beam corresponding to the target reference signal number.

In an embodiment, the downlink information includes at least one of: a physical downlink control channel (PDCCH), a physical downlink shared channel (PDSCH), or a demodulation reference signal (DMRS). The base station can transmit different downlink information to the terminal through signal relay device. Different downlink can be applied to the same beam or different beams, which can be configured by the base station according to needs.

In an embodiment, transmitting the one or more TCI states to the signal relay device includes at least one of: semi-statically transmitting the one or more TCI states to the signal relay device: or dynamically transmitting the one or more TCI states to the signal relay device.

In an embodiment, the base station may semi-statically transmit the one or more TCI states to the signal relay device. semi-statically transmitting the one or more TCI states to the signal relay device includes: transmitting the one or more TCI states, and at least one of a period corresponding to each of the one or more TCI states or time period information for a period corresponding to each of the one or more TCI states to the signal relay device.

For example, the base station may determine one or more TCI states, and a period corresponding to each of the one or more TCI states, such as a radio frame, and may further be precise as to a time period corresponding to each of the one or more TCI states within the period, such as a subframe within the radio frame. Thereby the base station may indicate the one or more TCI states, and at least one of a period corresponding to each of the one or more TCI states or time period information for a period corresponding to each of the one or more TCI states to the signal relay device.

The signal relay device may further determine that the TCI state is in effect during the period corresponding to the TCI state, or the time period in the period corresponding to the TCI state. Thereby the signal relay device may use the TCI state to determine the beam corresponding to the target reference signal number, and use the determined beam to transmit the downlink information to the terminal.

Accordingly, the TCI state is periodically effective for the signal relay device. The base station, by configuring the TCI state once, can realize that the signal relay device is able to determine the beam corresponding to the target reference signal number according to the TCI state in subsequent periods without having to reconfigure the TCI state each time the downlink information is transmitted, which is conducive to saving communication resources.

In an embodiment, the base station may also dynamically transmit the TCI state to the signal relay device. Dynamically transmitting the one or more TCI states to the signal relay device includes: indicating, by sidelink control information, a TCI state of each time domain resource corresponding to the downlink information.

For example, if the base station transmits the downlink information to the terminal through the signal relay device at different time domain resources, such as time slots, respectively, the terminal may indicate the TCI state of each of the different time domain resources corresponding to the downlink information via sidelink control information (SCI). For example, each time the terminal transmits the downlink information to the terminal via the signal relay device, the terminal may first transmit the SCI to the signal relay device to indicate the TCI state via the SCI. Whereby the signal relay device may determine the TCI state based on the SCI transmitted by the terminal each time before transmitting the downlink information to the terminal, thereby the beam corresponding to the target reference signal number is determined based on the TCI state, and the downlink information can be transmitted to the terminal by the determined beam.

Each time the TCI state is indicated to the signal relay device through the SCI when the base station transmits the downlink information to the terminal through the signal relay device. The TCI state can be determined by the base station based on actual conditions (such as the real-time position of the terminal, the current downlink information being transmitted), which helps to ensure that the beam corresponding to the target reference signal number indicated by the TCI state is more in line with the actual conditions and ensures good communication performance.

Figure 4:
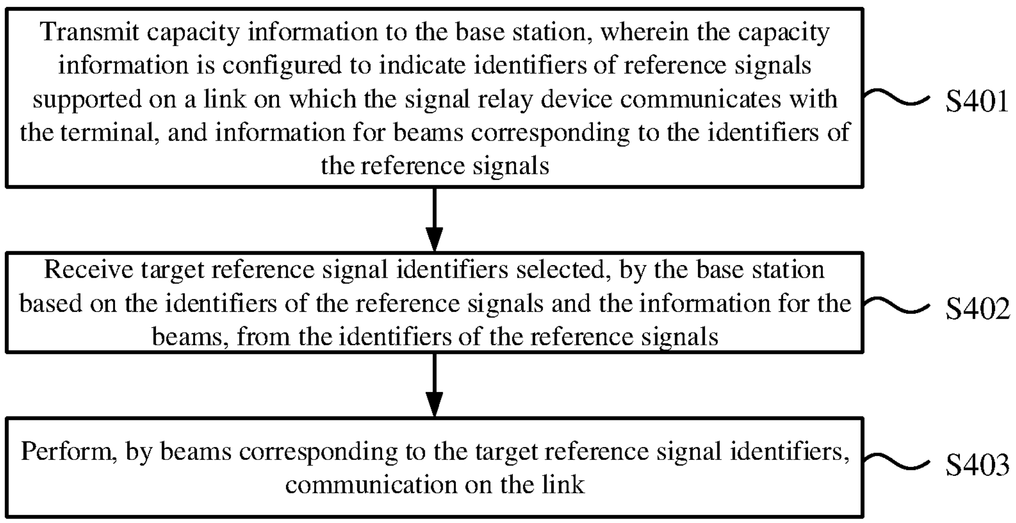
FIG. 4 is a schematic flowchart illustrating a beam determination method according to an embodiment of the present disclosure.

FIG. 4 is a schematic flowchart illustrating a beam determination method according to an embodiment of the present disclosure. The beam determination method shown in this embodiment may be performed by a signal relay device, where a signal is transmitted between a base station and a terminal at least by the signal relay device. The base station may communicate with the terminal. The terminal may include, but be not limited to, a communication device such as a cell phone, a tablet computer, a wearable device, a sensor, an IoT device, etc., and the base station may include, but be not limited to, a base station in a communication system such as a 4G base station, a 5G base station, a 6G base station, etc.

In an embodiment, the base station and the terminal may communicate with each other at least by the signal relay device. The signal relay device can transmit a signal (e.g., referred to as a downlink signal) transmitted by the base station to the terminal, and can also transmit a signal (e.g., referred to as an uplink signal) transmitted by the terminal to the base station.

In an embodiment, the signal relay device includes at least one of: a smart repeater, or a reconfigurable intelligent surface (RIS).

Conventional radio frequency (RF) relay can only perform receiving, RF converting, and amplifying and forwarding a RF signal, and cannot reflect a beam signal or perform operations such as beam fouling, which imposes limitations on the performance of the communication system.

The RIS is different from traditional RF relay. in the embodiments of the present disclosure, the RIS can be deployed on any one of surfaces of various types of objects in the wireless transmission environment to receive and reflect beams, which is expected to break through the uncontrollability of the conventional wireless channel, build an intelligent and programmable wireless environment, and introduce a new paradigm of future wireless communication. On the one hand, the RIS can actively enrich the channel scattering conditions and enhance the multiplexing gain of the wireless communication system. On the other hand, the RIS can realize the signal propagation direction regulation and isophase superposition in three-dimensional space, increase the received signal strength, and improve the transmission performance between communication devices. Therefore, the RIS has great potential to be used for coverage enhancement and capacity boosting of future wireless networks to eliminate localized coverage voids.

The intelligent repeater is also different from the conventional RF relay in that the intelligent relay can not only realize the functions that are already available in the conventional relays, such as receiving, RF converting, and amplifying and retransmitting RF signals, but also receiving beams, transmitting beams, and performing operations such as beam fouling.

As shown in FIG. 4, the beam determination method may include the following steps S401 to S403.

At step S401, capacity information is transmitted to the base station, where the capacity information is configured to indicate identifiers of reference signals supported on a link on which the signal relay device communicates with the terminal, and information for beams corresponding to the identifiers of the reference signals.

At step S402, target reference signal identifiers selected, by the base station based on the identifiers of the reference signals and the information for the beams, from the identifiers of the reference signals are received.

At step S403, communication on the link is performed by beams corresponding to the target reference signal identifiers.

In an embodiment, the base station may communicate with the terminal via the signal relay device. In this case, there are two links from the base station to the terminal, the one link is from the base station to the signal relay device, and the other link is from the signal relay device to the terminal. The embodiments of the present disclosure primarily describe communication on the link from the signal relay device to the terminal. In addition, it is to be noted that the base station, when communicating with the terminal via the signal relay device, may also communicate directly with the terminal at the same time, and the present disclosure does not limit the manner of communication between the base station and the terminal.

In an embodiment, the capabilities of different signal relay devices may be different. For example, the identifiers of the reference signals supported on a link on which the signal relay device communicates with the terminal, and the information of the beams corresponding to the identifiers of the reference signals may be different. The identifiers of the reference signals include at least one of: a SSB index, or a CSI-RS port number.

For example, some signal relay devices support the identifiers of the reference signals with the SSB indexes 1 to 64, and some signal relay devices support the identifiers of the reference signals with the CSI-RS ports 1 to 32.

Moreover, since there is a correspondence between an identifier of a reference signal and a beam, information of supported beams will be different depending on identifiers of supported reference signals. The information of the beam includes at least one of: a beam angle range, or a beam frequency. The following is mainly exemplary for the beam angle range.

For example, there are signal relay devices that support a beam angle range of 0° to 180°, and there are signal relay devices that support a beam angle range of 0° to 270°. An endpoint and a direction corresponding to 0° of the beam angle range may be configured by the base station. For example, the endpoint may be a location of the signal relay device, and the direction corresponding to 0° may be a direction in which the signal relay device is pointing towards the base station.

The signal relay device can report the capability information to the base station, such that the base station can determine identifiers of reference signals supported on a link on which the signal relay device communicates with the terminal, and information for beams corresponding to the identifiers of the reference signals. For example, it is determined that the signal relay device supports CSI-RS ports 1 to 32, each of which corresponds to a beam with an angle range of 5°, e.g., CSI-RS port 1 corresponds to a beam with an angle range of 0° to 5°, CSI-RS port 2 corresponds to a beam with an angle range of 5° to 10°, and so on, and an angle range of a beam corresponding to CSI-RS port 32 is 155° to 160°.

Further, the base station may select, according to the need, beams corresponding to target reference signal identifiers from the beams corresponding to the identities of the reference signals supported by the signal relay device, and indicate the beams corresponding to the target reference signal identifiers to the signal relay device. For example. if the base station determines that, according to the need, it is only necessary for the signal relay device to use the beam for communication in the beam angle range of 40° to 80°, the base station can determine that CSI-RS ports 9 to 16 are the target reference signal identifiers, and the CSI-RS ports 9 to 16 are configured to the signal relay device. Subsequent the signal relay device may perform communication on the link from the signal relay device to the terminal via the beams corresponding to one or more of the CSI-RS ports 9 to 16.

According to the embodiments of the present disclosure, the base station may configure a suitable beam for the signal relay device based on the capability information of the signal relay device for communication on the link from the signal relay device to the terminal. It is avoided that the signal relay device uses too many beams and causes waste of resources, or uses too few beams and causes deterioration of communication quality.

Figure 5:
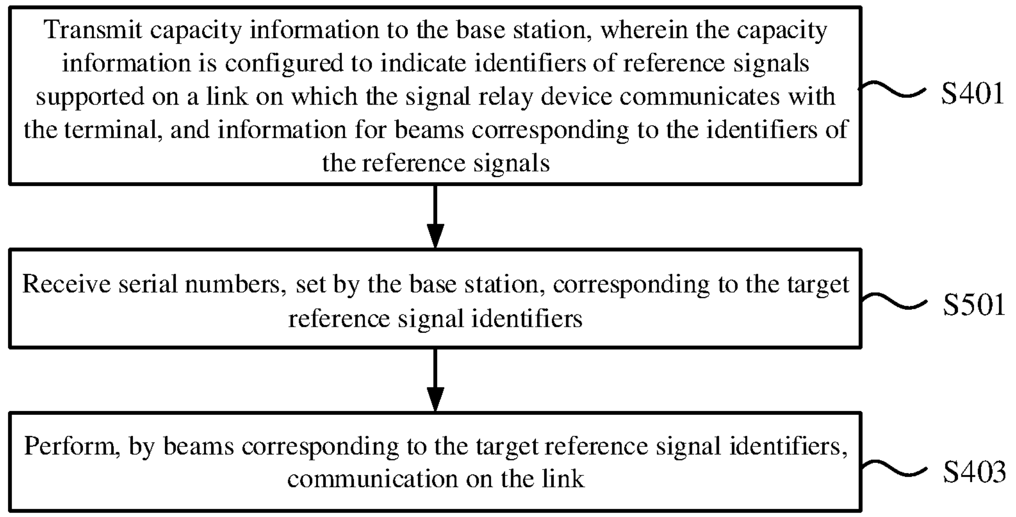
FIG. 5 is a schematic flowchart illustrating a beam determination method according to another embodiment of the present disclosure.

FIG. 5 is a schematic flowchart illustrating a beam determination method according to another embodiment of the present disclosure. As shown in FIG. 5, receiving the target reference signal identifiers selected, by the base station based on the identifiers of the reference signals and the information for the beams, from the identifiers of the reference signals includes the following step S501.

At step S501, serial numbers, set by the base station, corresponding to the target reference signal identifiers are received.

In an embodiment, the base station may select, according to the need, the beams corresponding to the target reference signal identifiers from the beams corresponding to the identities of the reference signals supported by the signal relay device, and indicate the beams corresponding to the target reference signal identifiers to the signal relay device.

For example, the signal relay device supports CSI-RS ports 1 to 32, and each CSI-RS port corresponds to a beam angle range of 5°, such as CSI-RS port 1 corresponds to a beam with an angle range of 0° to 5°, CSI-RS port 2 corresponds to a beam with an angle range of 5° to 10°, and so on, and an angle range of a beam corresponding CSI-RS port 32 is from 155° to 160°.

If the base station determines that, according to the need, it is only necessary for the signal relay device to use the beam for communication in the beam angle range of 40° to 80°, the base station can determine that CSI-RS ports 9 to 16 are the target reference signal identifiers.

After the target reference signal identifiers are determined, since a number of the target reference signal identifiers is, in general, less than a number of the identifiers of the reference signals, e.g., in this embodiment, the number of the target reference signal identifiers is eight, and the number of the identifiers of the reference signals is thirty-two, serial numbers corresponding to the target reference signal identifiers can be set, i.e., the target reference signal identifiers can be renumbered.

For example, the target reference signal identifiers are CSI-RS ports 9 to 16 of the thirty-two CSI-RS ports. If the CSI-RS ports 9 to 16 are indicated by the original serial numbers (i.e., 9 to 16) of the CSI-RS ports 9 to 16, thirty-two indication results would be required, with occupying at least 5 bits, but in reality, the number of the target reference signal identifiers is only eight. In the embodiment of the present disclosure, the CSI-RS ports (i.e., the target reference signal identifiers) can be renumbered, so that the CSI-RS ports 9 to 16 correspond to the serial numbers from 1 to 8. For example, serial number 1 (corresponding to bit 000) corresponds to the CSI-RS port 9, serial number 2 (corresponding to bit 001) corresponds to the CSI-RS port 10, and so on, and serial number 8 (corresponding to bit 111) corresponds to the CSI-RS port 16, thereby only 3 bits are required to realize indication of eight identifiers, and the communication resources are saved.

Figure 6:
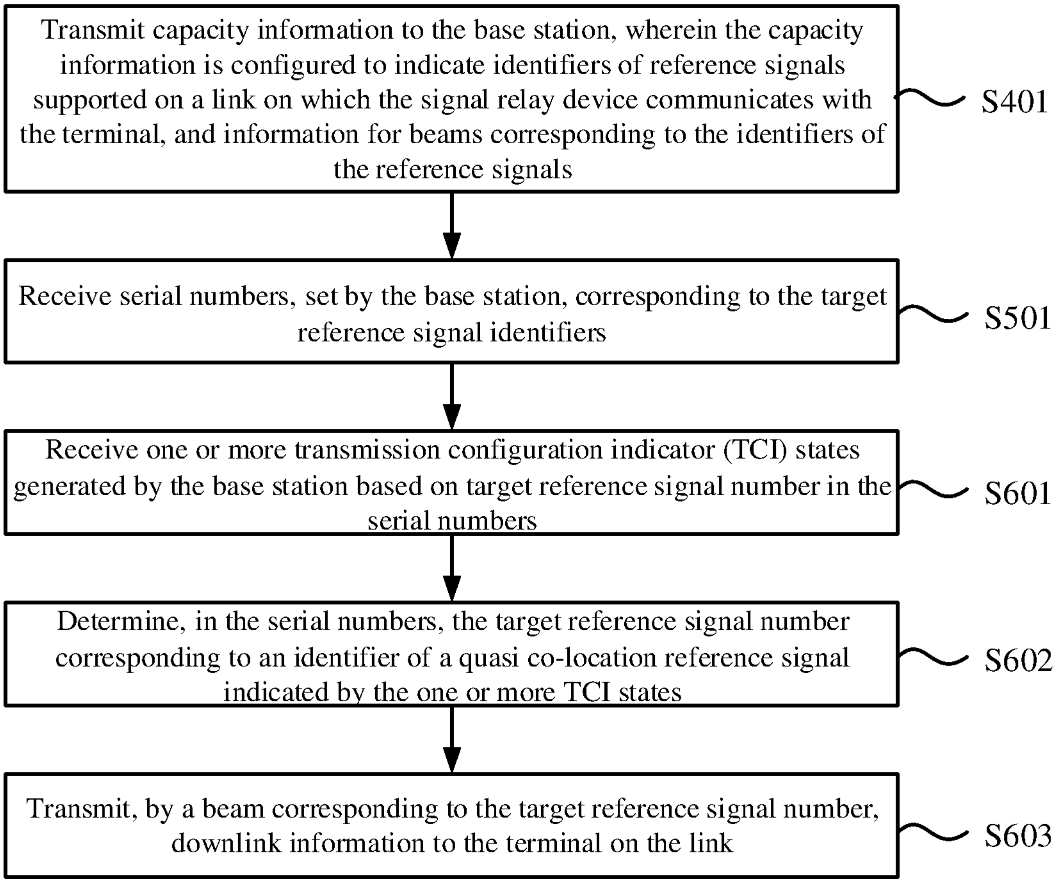
FIG. 6 is a schematic flowchart illustrating a beam determination method according to yet another embodiment of the present disclosure.

FIG. 6 is a schematic flowchart illustrating a beam determination method according to yet another embodiment of the present disclosure. As shown in FIG. 6, performing, by the beams corresponding to the target reference signal identifiers, the communication on the link includes the following steps S601 to S603.

At step S601, one or more transmission configuration indicator (TCI) states generated by the base station based on target reference signal number in the serial numbers are received.

At step S602, the target reference signal number corresponding to an identifier of a quasi co-location reference signal indicated by the one or more TCI states is determined in the serial numbers.

At step S603, downlink information is transmitted to the terminal on the link by a beam corresponding to the target reference signal number.

In an embodiment, the base station, after setting the serial numbers corresponding to the target reference signal identifiers and configuring the serial numbers to the signal relay device, may further select a target reference signal number selected from the serial numbers configured to the signal relay device as needed.

Since the positions of the base station and the signal relay device are generally relatively fixed (of course, they can also be set to be mobile as needed), and the position of the terminal is generally changing, when each time the base station transmits the downlink information to the terminal via the signal relay device, the terminal may be positioned all differently. The terminal may report its own position to the base station or report the reference signal identifier corresponding to the proposed beam, so that the base station may determine, based on the position of the terminal, which angle of the beam used by the signal relay device is more appropriate for transmitting the downlink information to the terminal, or the base station may determine, based on the reference signal identifier corresponding to the proposed beam reported by the terminal, which angle of the beam used by the signal relay device is more appropriate for transmitting the downlink information to the terminal. Of course, in addition to determining the target reference signal number based on the position of the terminal, the base station may also determine the target reference signal number by taking other factors into account, for example, the target reference signal number corresponding to the beam may be determined based on the downlink information.

For example, if the base station determines that the signal relay device needs to transmit the downlink information to the terminal by using the beam corresponding to the target reference signal number, the target reference signal number may be indicated by transmitting a TCI state to the signal relay device, i.e., the target reference signal number may be indicated by the TCI state. For example, the signal relay device may determine that a serial number corresponding to an identifier of a QCL reference signal indicated by the TCI state in the serial numbers is the target reference signal number, i.e., the beam corresponding to the target reference signal number determined by the signal relay device is the same as the beam of the QCL reference signal, thereby the signal relay device may transmit the downlink information to the terminal by the beam corresponding to the target reference signal number.

In an embodiment, the downlink information includes at least one of: a PDCCH, a PDSCH, or a DMRS. The base station can transmit different downlink information to the terminal through signal relay device. Different downlink can be applied to the same beam or different beams, which can be configured by the base station according to needs.

In an embodiment, receiving the one or more TCI states generated by the base station based on the target reference signal number in the serial numbers includes:

- receiving the one or more TCI states, and at least one of a period corresponding to each of the one or more TCI states or time period information for a period corresponding to each of the one or more TCI states transmitted by the base station: and
- determining, based on at least one of the period corresponding to each of the one or more TCI states or the time period information for the period corresponding to each of the one or more TCI states, a corresponding TCI state.

In an embodiment, the base station may semi-statically transmit the one or more TCI states to the signal relay device. semi-statically transmitting the one or more TCI states to the signal relay device includes: transmitting the one or more TCI states, and at least one of a period corresponding to each of the one or more TCI states or time period information for a period corresponding to each of the one or more TCI states to the signal relay device.

For example, the base station may determine one or more TCI states, and a period corresponding to each of the one or more TCI states, such as a radio frame, and may further be precise as to a time period corresponding to each of the one or more TCI states within the period, such as a subframe within the radio frame. Thereby the base station may indicate the one or more TCI states, and at least one of a period corresponding to each of the one or more TCI states or time period information for a period corresponding to each of the one or more TCI states to the signal relay device.

The signal relay device may further determine that the TCI state is in effect during the period corresponding to the TCI state, or the time period in the period corresponding to the TCI state. Thereby the signal relay device may use the TCI state to determine the beam corresponding to the target reference signal number, and use the determined beam to transmit the downlink information to the terminal.

Accordingly, the TCI state is periodically effective for the signal relay device. The base station, by configuring the TCI state once, can realize that the signal relay device is able to determine the beam corresponding to the target reference signal number according to the TCI state in subsequent periods without having to reconfigure the TCI state each time the downlink information is transmitted, which is conducive to saving communication resources.

In an embodiment, receiving the one or more TCI states generated by the base station based on the target reference signal number in the serial numbers includes:

- determining, based on sidelink control information (SCI) transmitted by the base station, a TCI state of each time domain resource corresponding to the downlink information.

In an embodiment, the base station may also dynamically transmit the TCI state to the signal relay device. Dynamically transmitting the one or more TCI states to the signal relay device includes: indicating, by the SCI, the TCI state of each time domain resource corresponding to the downlink information.

For example, if the base station transmits the downlink information to the terminal through the signal relay device at different time domain resources, such as time slots, respectively, the terminal may indicate the TCI state of each of the different time domain resources corresponding to the downlink information via the SCI. For example, each time the terminal transmits the downlink information to the terminal via the signal relay device, the terminal may first transmit the SCI to the signal relay device to indicate the TCI state via the SCI. Whereby the signal relay device may determine the TCI state based on the SCI transmitted by the terminal each time before transmitting the downlink information to the terminal, thereby the beam corresponding to the target reference signal number is determined based on the TCI state, and the downlink information can be transmitted to the terminal by the determined beam.

Each time the TCI state is indicated to the signal relay device through the SCI when the base station transmits the downlink information to the terminal through the signal relay device. The TCI state can be determined by the base station based on actual conditions (such as the real-time position of the terminal, the current downlink information being transmitted), which helps to ensure that the beam corresponding to the target reference signal number indicated by the TCI state is more in line with the actual conditions and ensures good communication performance.

Figure 7:
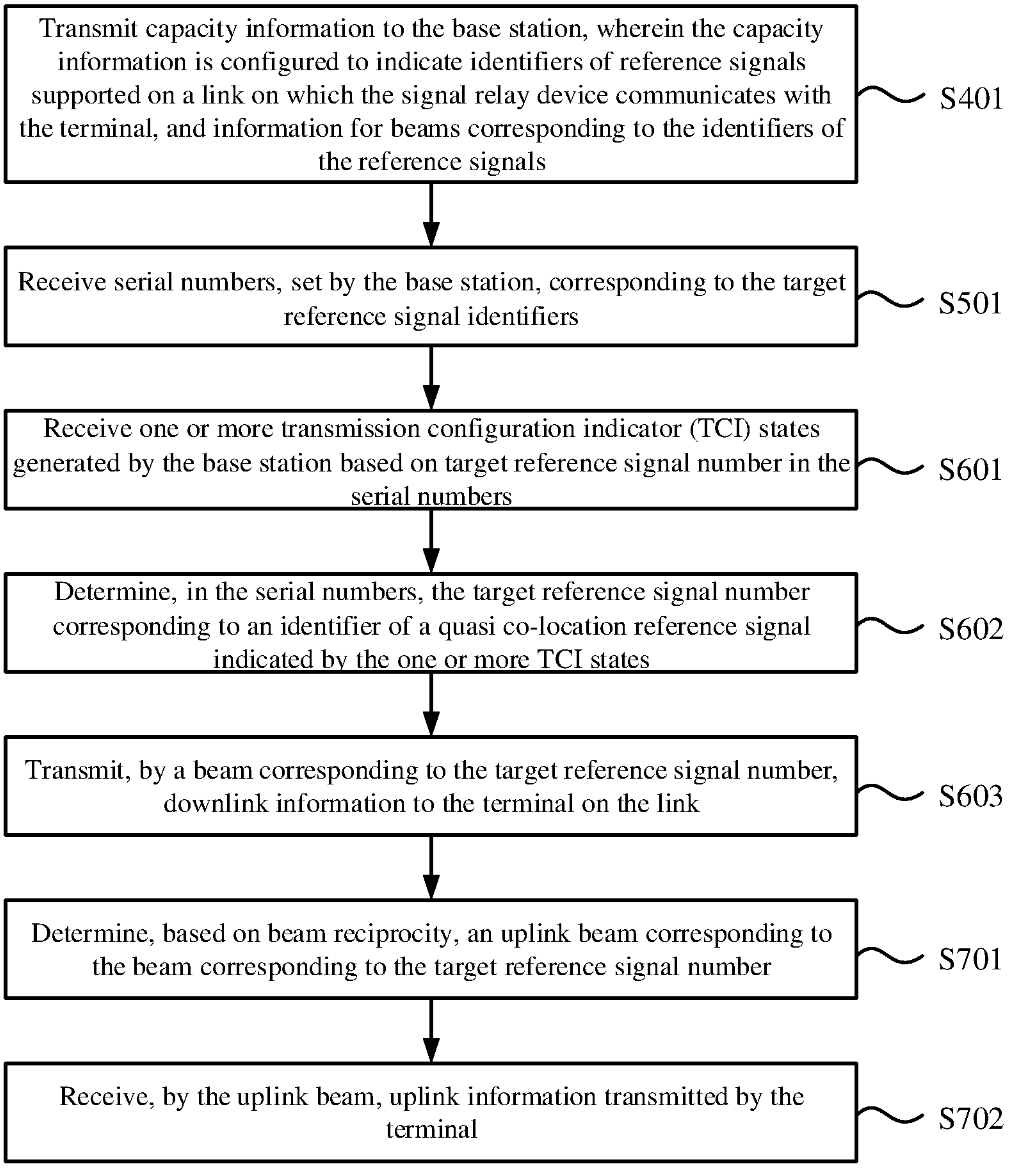
FIG. 7 is a schematic flowchart illustrating a beam determination method according to still another embodiment of the present disclosure.

FIG. 7 is a schematic flowchart illustrating a beam determination method according to still another embodiment of the present disclosure. As shown in FIG. 7, the method further includes the following steps S701 to S702.

At step S701, an uplink beam corresponding to the beam corresponding to the target reference signal number is determined based on beam reciprocity.

At step S702, uplink information transmitted by the terminal is received by the uplink beam.

In an embodiment, the signal relay device, in the case of transmitting the downlink information to the terminal via the beam corresponding to the target reference signal number, may subsequently also receive uplink information transmitted by the terminal and transmit the uplink information to the base station.

The uplink information transmitted by the terminal also needs to be received via an uplink beam. It is necessary to determine which uplink beam is used for reception based on the beam reciprocity. For example, in the same direction, the characteristics of the beam corresponding to the target reference signal number and the uplink beam are basically the same, then the signal relay device can estimate the characteristic of the uplink beam based on the characteristic of the beam corresponding to the target reference signal number, such that the signal relay device can use the uplink beam to receive the uplink information transmitted by the terminal based on the characteristic of the uplink beam.

The embodiments of the present disclosure also provide a terminal that may communicate with a base station and a signal relay device based on the beam configuration method described in any of the foregoing embodiments, and/or the beam determination method described in any of the foregoing embodiments.

Corresponding to the embodiments of the beam configuration method and the beam determination method described in the embodiments, the present disclosure also provides embodiments of a beam configuration device and a beam determination device.

Embodiments of the present disclosure provide a beam configuration device. The beam configuration device may be applied to a base station. The base station may communicate with a terminal. The terminal may include, but be not limited to, a communication device such as a cellular phone, a tablet, a wearable device, a sensor, an IoT device, etc., and the base station may include, but be not limited to, a base station in a communication system such as a 4G base station, a 5G base station, a 6G base station, etc.

In an embodiment, the base station and the terminal may communicate with each other at least by the signal relay device. The signal relay device can transmit a signal (e.g., referred to as a downlink signal) transmitted by the base station to the terminal, and can also transmit a signal (e.g., referred to as an uplink signal) transmitted by the terminal to the base station.

In an embodiment, the device includes one or more processors, configured to perform operations including:

receiving capability information transmitted by the signal relay device;

determining, based on the capability information, identifiers of reference signals supported on a link on which the signal relay device communicates with the terminal, and information for beams corresponding to the identifiers of the reference signals: and selecting, based on the identifiers of the reference signals and the information for the beams, target reference signal identifiers from the identifiers of the reference signals, and configuring the target reference signal identifiers to the signal relay device for communication of the signal relay device on the link by beams corresponding to the target reference signal identifiers.

In an embodiment, the signal relay device includes at least one of: a smart repeater, or a RIS.

In an embodiment, the information for the beams includes at least one of: a beam angle range, or a beam frequency.

In an embodiment, the identifiers of the reference signals include at least one of: a SSB index, or a CSI-RS port number.

In an embodiment, the processor is configured to perform the operations further including:

selecting, based on the identifiers of the reference signals and the information for the beams, the target reference signal identifiers from the identifiers of the reference signals;

setting serial numbers corresponding to the target reference signal identifiers: and configuring the serial numbers to the signal relay device.

In an embodiment, the processor is configured to perform the operations further including:

selecting a target reference signal number from the serial numbers when transmitting downlink information to the terminal by the signal relay device;

generating, based on the target reference signal number, one or more transmission configuration indicator (TCI) states; and transmitting the one or more TCI states to the signal relay device to instruct the signal relay device to transmit, by a beam corresponding to the target reference signal number, the downlink information to the terminal on the link.

In an embodiment, the downlink information includes at least one of:

a PDCCH, a PDSCH, or a DMRS.

In an embodiment, the processor is configured to perform the operations further including:

semi-statically transmitting the one or more TCI states to the signal relay device: and/or dynamically transmitting the one or more TCI states to the signal relay device.

In an embodiment, the processor is configured to perform the operations further including:

transmitting the one or more TCI states, and at least one of a period corresponding to each of the one or more TCI states or time period information for a period corresponding to each of the one or more TCI states to the signal relay device.

In an embodiment, the processor is configured to perform the operations further including:

indicating, by sidelink control information, a TCI state of each time domain resource corresponding to the downlink information.

Embodiments of the present disclosure provide a beam determination device. The beam determination device is applied to a signal relay device. A signal is transmitted between a base station and a terminal at least through the signal relay device. The base station may communicate with the terminal. The terminal may include, but be not limited to, a communication device such as a cellular phone, a tablet, a wearable device, a sensor, an IoT device, etc., and the base station may include, but be not limited to, a base station in a communication system such as a 4G base station, a 5G base station, a 6G base station, etc.

In an embodiment, the base station and the terminal may communicate with each other at least by the signal relay device. The signal relay device can transmit a signal (e.g., referred to as a downlink signal) transmitted by the base station to the terminal, and can also transmit a signal (e.g., referred to as an uplink signal) transmitted by the terminal to the base station.

In an embodiment, the device includes one or more processors, configured to perform operations including:

transmitting capacity information to the base station, where the capacity information is configured to indicate identifiers of reference signals supported on a link on which the signal relay device communicates with the terminal, and information for beams corresponding to the identifiers of the reference signals;

receiving target reference signal identifiers selected, by the base station based on the identifiers of the reference signals and the information for the beams, from the identifiers of the reference signals; and performing, by beams corresponding to the target reference signal identifiers, communication on the link.

In an embodiment, the signal relay device includes at least one of: a smart repeater, or a RIS.

In an embodiment, the information for the beams includes at least one of: a beam angle range, or a beam frequency.

In an embodiment, the identifiers of the reference signals include at least one of: a SSB index, or a CSI-RS port number.

In an embodiment, the processor is configured to perform the operations further including: receiving serial numbers, set by the base station, corresponding to the target reference signal identifiers.

In an embodiment, the processor is configured to perform the operations further including:

receiving one or more transmission configuration indicator (TCI) states generated by the base station based on target reference signal number in the serial numbers;

determining, in the serial numbers, the target reference signal number corresponding to an identifier of a quasi co-location reference signal indicated by the one or more TCI states; and transmitting, by a beam corresponding to the target reference signal number, downlink information to the terminal on the link.

In an embodiment, the downlink information includes at least one of:

a PDCCH, a PDSCH, or a DMRS.

In an embodiment, the processor is configured to perform the operations further including:

receiving the one or more TCI states, and at least one of a period corresponding to each of the one or more TCI states or time period information for a period corresponding to each of the one or more TCI states transmitted by the base station: and determining, based on at least one of the period corresponding to each of the one or more TCI states or the time period information for the period corresponding to each of the one or more TCI states, a corresponding TCI state.

In an embodiment, the processor is configured to perform the operations further including:

determining, based on sidelink control information transmitted by the base station, a TCI state of each time domain resource corresponding to the downlink information.

In an embodiment, the processor is configured to perform the operations further including:

determining, based on beam reciprocity, an uplink beam corresponding to the beam corresponding to the target reference signal number: and receiving, by the uplink beam, uplink information transmitted by the terminal.

With respect to the apparatus in the above-mentioned embodiments, the specific manner in which each module performs operations has been described in detail in the embodiments of the relevant method, and will not be described in detail herein.

Since the apparatus embodiments basically correspond to the method embodiments, it is sufficient to refer to relevant parts of the description of the method embodiments. The above-mentioned apparatus embodiments are merely schematic, where the modules described as separated components may or may not be physically separated, and the components shown as modules may or may not be physical modules, i.e., they may be located in one place or may be distributed to multiple network modules. Some or all of these modules may be selected to achieve the purpose of the solution according to actual needs, and these modules can be understood and implemented by those skilled in the art without creative works.

An embodiment of the present disclosure further proposes a base station including: a processor: and a memory storing computer programs, where the computer programs, when executed by the processor, cause the processor to perform the beam configuration method in any of the embodiments.

An embodiment of the present disclosure further proposes a signal relay device including: a processor: and a memory storing computer programs, where the computer programs, when executed by the processor, cause the processor to perform the beam determination method in any of the embodiments.

An embodiment of the present disclosure further proposes a computer-readable storage medium storing computer programs thereon, where the computer programs, when executed by a processor, cause the processor to perform the beam configuration method in any of the embodiments.

An embodiment of the present disclosure further proposes a computer-readable storage medium storing computer programs thereon, where the computer programs, when executed by a processor, cause the processor to perform the beam determination method in any of the embodiments.

Figure 8:
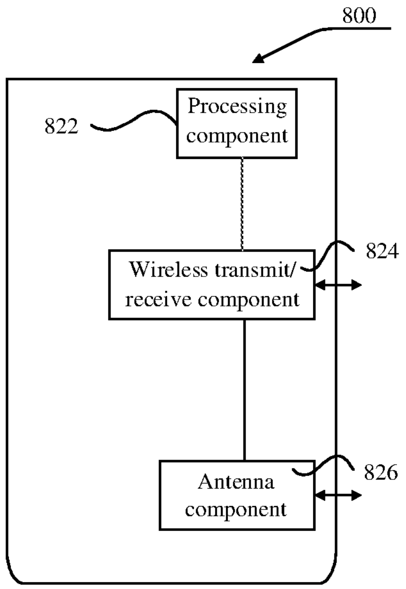
FIG. 8 is a schematic block diagram illustrating a beam configuration device according to an embodiment of the present disclosure.

FIG. 8 is a schematic block diagram illustrating a beam configuration device 800 according to an embodiment of the present disclosure. As shown in FIG. 8, The device 800 may be provided as a base station. In an embodiment, the base station may be a source base station or a target base station. The device 800 includes a processing component 822, a wireless transmit/receive component 824, an antenna component 826, and a signal processing portion specific to the wireless interface, and the processing component 822 may further include one or more processors. One of the processors in the processing component 822 may be configured to implement the beam configuration method described in any of the above-mentioned embodiments.

Figure 9:
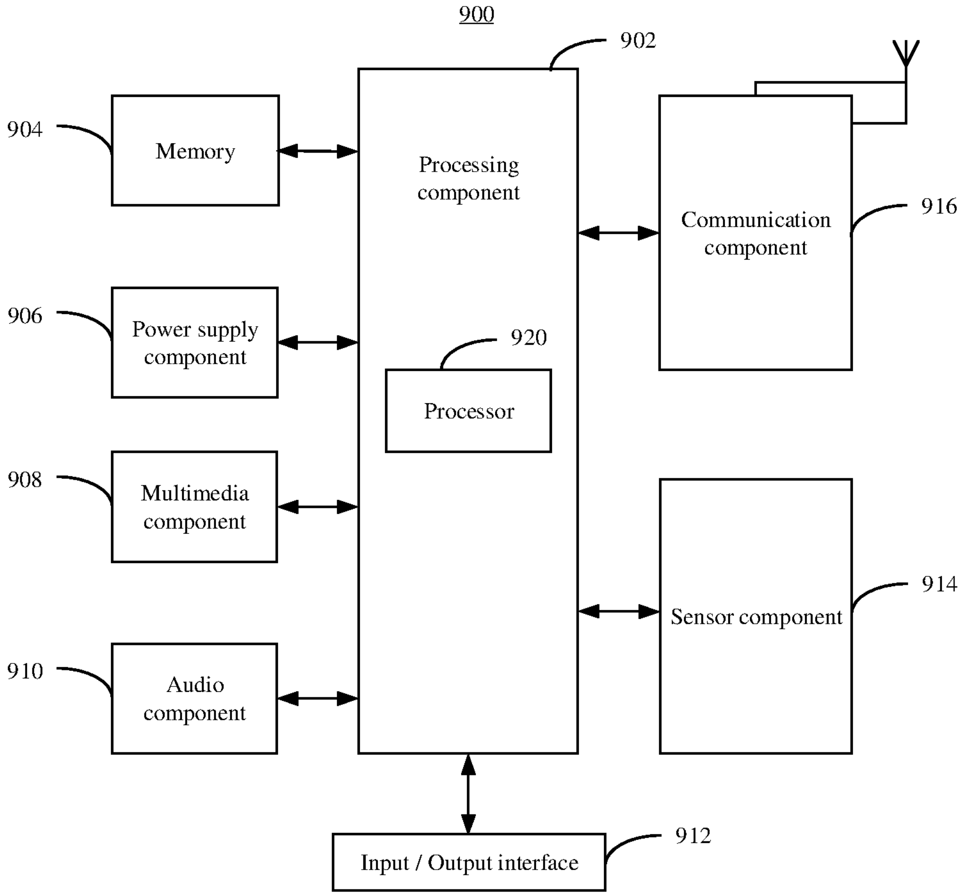
FIG. 9 is a schematic block diagram illustrating a terminal according to an embodiment of the present disclosure.

FIG. 9 is a schematic block diagram illustrating a terminal 900 according to another embodiment of the present disclosure. For example, the terminal 900 may be a mobile phone, a computer, a digital broadcast user equipment, a message transceiver, a game console, a tablet device, a medical device, a fitness device, a personal digital assistant, and the like.

As shown in FIG. 9, the electronic terminal 900 may include one or more assemblies of a processing component 902, a memory 904, a power supply component 906, a multimedia component 908, an audio component 910, an input/output (I/O) interface 912, a sensor component 914 and a communication component 916.

The processing component 902 generally controls the overall operation of the electronic terminal 900, such as operations associated with displays, phone calls, data transmissions, camera operations, and recording operations. The processing component 902 may include one or more processors 920 to execute instructions to complete communication with the base station and/or the signal relay device. Further, the processing component 902 may include one or more modules to facilitate interaction between the processing component 902 and another component. For example, the processing component 902 may include a multimedia module to facilitate the interaction between the multimedia component 908 and the processing component 902. For another example, the processing component 902 may read executable instructions from the memory to perform steps in the data transmission method provided in an example as described above.

The memory 904 is configured to store different types of data to support operation at the electronic terminal 900. Examples of such data include instructions, contact data, phonebook data, messages, pictures, videos, and so on for any application or method that operates on the electronic terminal 900. The memory 904 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a disk or a CD.

The power supply component 906 provides power to different assemblies of the electronic terminal 900. The power supply component 906 may include a power source management system, one or more power sources and other assemblies associated with generating, managing and distributing power for the electronic terminal 900.

The multimedia component 908 includes a display screen that provides an output interface between the electronic terminal 900 and a user. In some embodiments, the multimedia component 908 may include a front camera and/or a rear camera. When the electronic terminal 900 is in an operating mode, such as in a shooting mode or a video mode, the front camera and/or the rear camera may receive external multimedia data. Each of the front camera and the rear camera may be a fixed optical lens system or be of a focal length and a capability of an optical zoom.

The audio component 910 is configured to output and/or input an audio signal. For example, the audio component 910 includes a microphone (MIC). When the electronic terminal 900 is in an operating mode, for example, in a call mode, a recording mode or a speech recognition mode, the microphone is configured to receive an external audio signal. The received audio signal may be further stored in the memory 904 or sent via the communication component 916. In some embodiments, the audio component 910 also includes a speaker for outputting an audio signal.

The I/O interface 912 may provide an interface between the processing component 902 and peripheral interface modules. The above peripheral interface modules may include a keyboard, a click wheel, buttons and so on. Such buttons may include but not limited to: a home button, a volume button, a start button and a lock button.

The sensor component 914 includes one or more sensors for evaluating states of the electronic terminal 900 in different aspects. For example, the sensor component 914 may detect the on/off state of the electronic terminal 900, and relative positioning of component, for example, the component is a display and a keypad of the electronic terminal 900. The sensor component 914 may also detect a change in position of the electronic terminal 900 or a component of the electronic terminal 900, a presence or absence of the contact between a user and the electronic terminal 900, an orientation or an acceleration/deceleration of the electronic terminal 900, and a change in temperature of the electronic terminal 900. The sensor component 914 may include a proximity sensor configured to detect presence of a nearby object without any physical contact. The sensor component 914 may also include an optical sensor, such as a CMOS or CCD image sensor used in an imaging application. In some embodiments, the sensor component 914 may also include an acceleration sensor, a gyroscope sensor, a magnetic sensor, a pressure sensor, or a temperature sensor.

The communication component 916 is configured to facilitate wired or wireless data transmission between the electronic terminal 900 and other devices. The electronic terminal 900 may access a wireless network based on a data transmission standard, such as Wi-Fi, 2G, 3G, 4G 5G or 6G, or a combination thereof. In some embodiments, the communication component 916 may receive a broadcast signal or broadcast-related information from an external broadcast management system via a broadcast channel. In an example, the communication component 916 may also include a Near Field Communication (NFC) module to facilitate short-range data transmissions. For example, the NFC module may be implemented based on radio frequency identifier (RFID) technology, infrared data association (IrDA) technology, ultra-wideband (UWB) technology, Bluetooth (BT) technology and other technologies.

In some illustrative embodiments, the electronic terminal 900 may be implemented by one or more of an application-specific integrated circuit (ASIC), a digital signal processor (DSP), a digital signal processing device (DSPD), programmable logical device (PLD), field programmable gate array (FPGA), a controller, microcontroller, a microprocessor or other electronic components to perform communication with the base station and/or the signal relay device.

In an example embodiment, there is also provided a non-transitory machine readable storage medium including instructions, such as a memory 904 including instructions, where the instructions are executable by the processor 920 of the electronic terminal 900 to perform communication with the base station and/or the signal relay device. For example, the non-transitory computer-readable storage medium may be a Read-Only Memory (ROM), a Random Access Memory (RAM), a CD-ROM, a magnetic tape, a floppy disk and an optical data storage device, etc.

After considering the specification and practicing the present disclosure, a person skilled in the art would easily conceive of other implementations of the present disclosure. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise construction described herein and shown in the drawings, and that various modifications and changes may be made without departing from the scope thereof. The scope of the disclosure is to be limited only by the appended claims.

It will be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The above are detailed descriptions of methods and apparatuses provided according to the embodiments of the present disclosure. Specific examples are used herein to set forth the principles and the implementing methods of the present disclosure, and the descriptions of the above embodiments are only meant to help understanding of the methods and the core idea of the present disclosure. Meanwhile, those of ordinary skill in the art may make alterations to the specific embodiments and the scope of application in accordance with the idea of the present disclosure. In conclusion, the contents of the present specification shall not be interpreted as limiting to the present disclosure.

The invention claimed is:

1. A beam configuration method, performed by a base station, wherein a signal is transmitted between the base station and a terminal at least by a signal relay device, and the method comprising:

receiving capability information transmitted by the signal relay device;

determining, based on the capability information, identifiers of reference signals supported on a link on which the signal relay device communicates with the terminal, and information for beams corresponding to the identifiers of the reference signals; and selecting, based on the identifiers of the reference signals and the information for the beams, target reference signal identifiers from the identifiers of the reference signals, and configuring the target reference signal identifiers to the signal relay device for communication of the signal relay device on the link by beams corresponding to the target reference signal identifiers;

wherein selecting, based on the identifiers of the reference signals and the information for the beams, the target reference signal identifiers from the identifiers of the reference signals, and configuring the target reference signal identifiers to the signal relay device for communication of the signal relay device on the link by the beams corresponding to the target reference signal identifiers comprise:

selecting, based on the identifiers of the reference signals and the information for the beams, the target reference signal identifiers from the identifiers of the reference signals;

setting serial numbers corresponding to the target reference signal identifiers; and configuring the serial numbers to the signal relay device.

2. The method of claim 1, wherein the signal relay device comprises at least one of: a smart repeater, or a reconfigurable intelligent surface.

3. The method of claim 1, wherein the information for the beams comprises at least one of: a beam angle range, or a beam frequency.

4. The method of claim 1, wherein the identifiers of the reference signals comprise at least one of: a synchronization signal block index, or a channel state information-reference signal port number.

5. The method of claim 1, further comprising:

selecting a target reference signal number from the serial numbers when transmitting downlink information to the terminal by the signal relay device;

generating, based on the target reference signal number, one or more transmission configuration indicator (TCI) states; and transmitting the one or more TCI states to the signal relay device to instruct the signal relay device to transmit, by a beam corresponding to the target reference signal number, the downlink information to the terminal on the link.

6. The method of claim 5, wherein the downlink information comprises at least one of: a physical downlink control channel, a physical downlink shared channel, or a demodulation reference signal.

7. The method of claim 5, wherein transmitting the one or more TCI states to the signal relay device comprises at least one of:

semi-statically transmitting the one or more TCI states to the signal relay device; or dynamically transmitting the one or more TCI states to the signal relay device.

8. The method of claim 7, wherein semi-statically transmitting the one or more TCI states to the signal relay device comprises:

transmitting the one or more TCI states, and at least one of a period corresponding to each of the one or more TCI states or time period information for a period corresponding to each of the one or more TCI states to the signal relay device.

9. The method of claim 7, wherein dynamically transmitting the one or more TCI states to the signal relay device comprises:

indicating, by sidelink control information, a TCI state of each time domain resource corresponding to the downlink information.

10. A base station, comprising:

a processor; and a memory storing computer programs;

wherein the computer programs, when executed by the processor, cause the processor to perform the beam configuration method of claim 1.

11. A beam determination method, performed by a signal relay device, wherein a signal is transmitted between a base station and a terminal at least by the signal relay device, and the method comprising:

transmitting capacity information to the base station, wherein the capacity information is configured to indicate identifiers of reference signals supported on a link on which the signal relay device communicates with the terminal, and information for beams corresponding to the identifiers of the reference signals;

receiving target reference signal identifiers selected, by the base station based on the identifiers of the reference signals and the information for the beams, from the identifiers of the reference signals; and performing, by beams corresponding to the target reference signal identifiers, communication on the link;

wherein receiving the target reference signal identifiers selected, by the base station based on the identifiers of the reference signals and the information for the beams, from the identifiers of the reference signals comprises:

receiving serial numbers, set by the base station, corresponding to the target reference signal identifiers;

wherein performing, by the beams corresponding to the target reference signal identifiers, the communication on the link comprises:

receiving one or more transmission configuration indicator (TCI) states generated by the base station based on target reference signal number in the serial numbers;

determining, in the serial numbers, the target reference signal number corresponding to an identifier of a quasi co-location reference signal indicated by the one or more TCI states; and transmitting, by a beam corresponding to the target reference signal number, downlink information to the terminal on the link.

12. The method of claim 11, wherein receiving the one or more TCI states generated by the base station based on the target reference signal number in the serial numbers comprises:

receiving the one or more TCI states, and at least one of a period corresponding to each of the one or more TCI states or time period information for a period corresponding to each of the one or more TCI states transmitted by the base station; and determining, based on at least one of the period corresponding to each of the one or more TCI states or the time period information for the period corresponding to each of the one or more TCI states, a corresponding TCI state.

13. The method of claim 11, wherein receiving the one or more TCI states generated by the base station based on the target reference signal number in the serial numbers comprises:

determining, based on sidelink control information transmitted by the base station, a TCI state of each time domain resource corresponding to the downlink information.

14. The method of claim 11, further comprising:

determining, based on beam reciprocity, an uplink beam corresponding to the beam corresponding to the target reference signal number; and receiving, by the uplink beam, uplink information transmitted by the terminal.

15. A beam determination device, applied to a signal relay device, wherein a signal is transmitted between a base station and a terminal at least by the signal relay device, and the beam determination device comprises one or more processors configured to perform the beam determination method of claim 11.

16. A signal relay device, comprising:

a processor; and a memory storing computer programs;

wherein the computer programs, when executed by the processor, cause to the processor to perform the beam determination method of claim 11.

17. A beam configuration device, applied to a base station, wherein a signal is transmitted between the base station and a terminal at least by a signal relay device, and the device comprises one or more processors configured to perform operations comprising:

receiving capability information transmitted by the signal relay device;

determining, based on the capability information, identifiers of reference signals supported on a link on which the signal relay device communicates with the terminal, and information for beams corresponding to the identifiers of the reference signals; and selecting, based on the identifiers of the reference signals and the information for the beams, target reference signal identifiers from the identifiers of the reference signals, and configuring the target reference signal identifiers to the signal relay device for communication of the signal relay device on the link by beams corresponding to the target reference signal identifiers;

wherein selecting, based on the identifiers of the reference signals and the information for the beams, the target reference signal identifiers from the identifiers of the reference signals, and configuring the target reference signal identifiers to the signal relay device for communication of the signal relay device on the link by the beams corresponding to the target reference signal identifiers comprise:

selecting, based on the identifiers of the reference signals and the information for the beams, the target reference signal identifiers from the identifiers of the reference signals;

setting serial numbers corresponding to the target reference signal identifiers; and configuring the serial numbers to the signal relay device.

* * * * *